United States Patent
Suzuki

(10) Patent No.: US 8,536,797 B2
(45) Date of Patent: Sep. 17, 2013

(54) SEMICONDUCTOR LIGHT SOURCE APPARATUS AND SEMICONDUCTOR LIGHT SOURCE CONTROL METHOD

(75) Inventor: Hideo Suzuki, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 204 days.

(21) Appl. No.: 13/214,371

(22) Filed: Aug. 22, 2011

(65) Prior Publication Data

US 2012/0049754 A1 Mar. 1, 2012

(30) Foreign Application Priority Data

Aug. 24, 2010 (JP) ................................. 2010-187237
Aug. 10, 2011 (JP) ................................. 2011-175070

(51) Int. Cl.
*H05B 37/02* (2006.01)

(52) U.S. Cl.
USPC ............................. 315/291; 315/224; 315/307

(58) Field of Classification Search
USPC ............................. 315/291, 224, 312, 307, 308
See application file for complete search history.

(56) References Cited

U.S. PATENT DOCUMENTS

| | | | |
|---|---|---|---|
| 7,276,863 B2 * | 10/2007 | Lee et al. | 315/307 |
| 7,312,783 B2 | 12/2007 | Oyama | |
| 7,358,685 B2 * | 4/2008 | Lee | 315/287 |
| 2006/0261754 A1 * | 11/2006 | Lee | 315/291 |
| 2008/0180039 A1 | 7/2008 | Masuko | |

FOREIGN PATENT DOCUMENTS

| | | |
|---|---|---|
| JP | 2005-11895 A | 1/2005 |
| JP | 2006-140438 A | 6/2006 |
| JP | 2008-177019 A | 7/2008 |

OTHER PUBLICATIONS

Japanese Office Action dated Oct. 16, 2012 (and English translation thereof) in counterpart Japanese Application No. 2011-175070.

* cited by examiner

*Primary Examiner* — David H Vu

(74) *Attorney, Agent, or Firm* — Holtz, Holtz, Goodman & Chick, PC

(57) ABSTRACT

A semiconductor light source apparatus includes a constant current switch controller that detects a voltage applied to a path when each one of the charging path and the discharging path is selected and switches the plurality of switching elements by calculating a switching duty ratio of the plurality of switching elements so that a current flowing through the passive element is maintained at a constant value in accordance with detection results, and a duty controller that adjusts a voltage value supplied by the power supply circuit in accordance with the switching duty ratio calculated by the constant current switch controller.

10 Claims, 2 Drawing Sheets

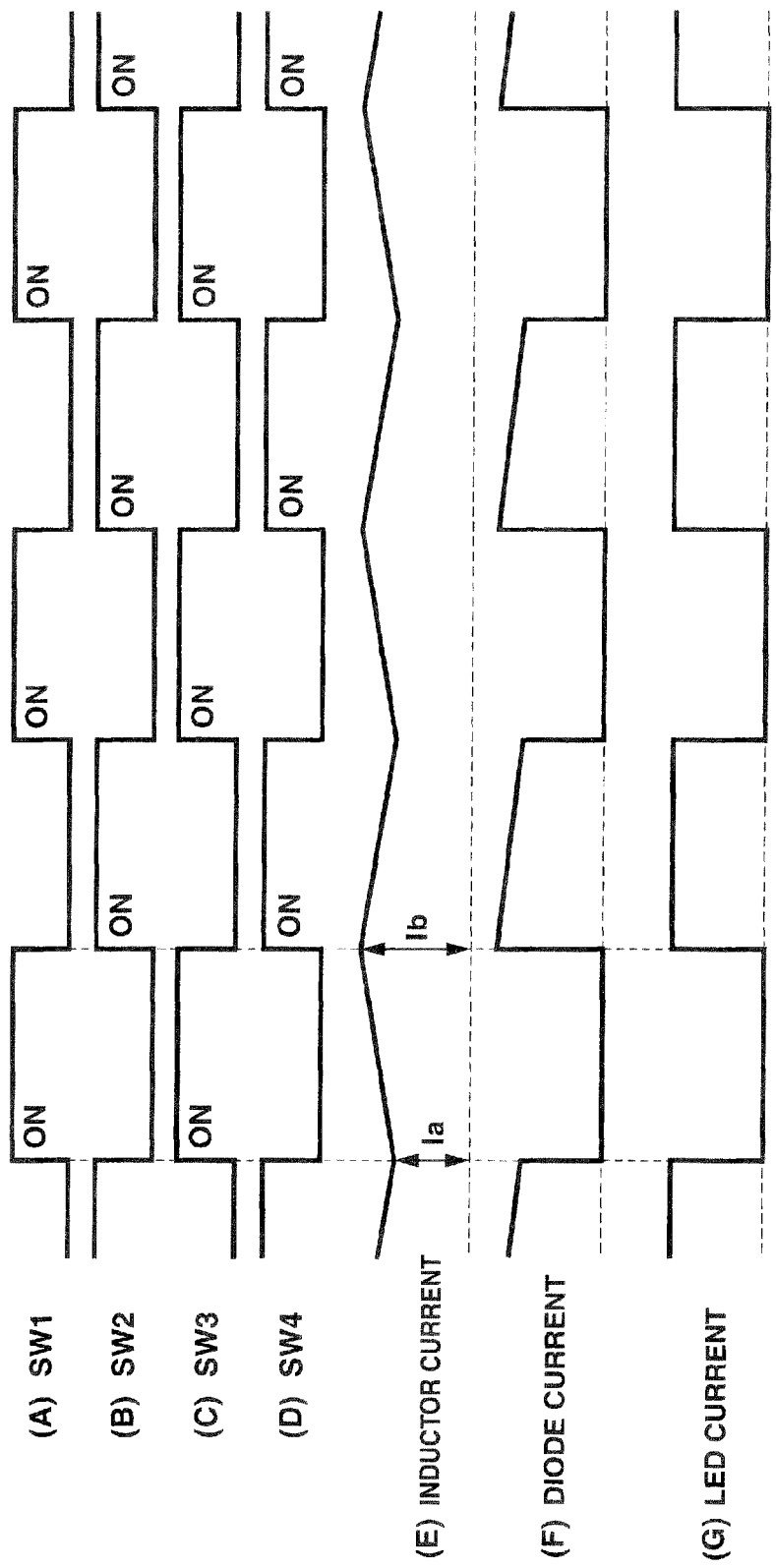

SEMICONDUCTOR LIGHT SOURCE APPARATUS AND SEMICONDUCTOR LIGHT SOURCE CONTROL METHOD

CROSS-REFERENCE TO RELATED APPLICATIONS

This application is based upon and claims the benefit of priority under 35 USC 119 of Japanese Patent Applications No. 2010-187237, filed Aug. 24, 2010; and No. 2011-175070, filed Aug. 10, 2011, the entire disclosures of all of which, including the description, claims, drawings, and abstract, are incorporated herein by reference in their entirety.

BACKGROUND OF THE INVENTION

1. Field of the Invention

The present invention relates to a semiconductor light source apparatus using a semiconductor light emitting device, for example, a light emitting diode (LED) or laser diode (LD), and a semiconductor light source control method.

2. Description of the Related Art

As an LED drive circuit to reduce power consumption and also to control LED brightness at a constant level, technology including Jpn. Pat. Appln, KOKAI Publication No. 2005-011895 can be considered.

Including the technology described in the above-described document, a drive of a semiconductor light emitting device is generally configured by a linear constant current circuit that gives current feedback by combining an operational amplifier and a power transistor or a constant current control type DC/DC converter.

It is necessary for fast PWM driving to advance a current rise in PWM waveforms. In the former linear constant current circuit, a current overshoot is caused by an overdrive due to a feedback delay. Thus, it is difficult to combine a faster operation with stable feedback control. When a faster operation is realized, the load on a transistor in an output stage is heavy so that it becomes necessary to allow more voltage margins and also to take measures against heating of the transistor.

In the latter DC/DC converter, a time of at least several to a dozen or so switching cycles is needed before the current of an inductor used in the circuit is returned to an original current value. Thus, due to such rise characteristics of the current, it is difficult to achieve a faster operation.

Recently, to improve difficulties described above in the latter DC/DC converter, a DC/DC converter that can achieve a faster operation by temporarily holding a feedback voltage when the PWM waveform is on or an output voltage of a capacitor in the circuit to make the current rise steep when the PWM waveform is on next time. Despite the above efforts, faster PWM cycles limited to about several ten [kHz] and it is difficult to achieve a still faster operation.

BRIEF SUMMARY OF THE INVENTION

According to one aspect of the present invention, there is provided a semiconductor light source apparatus, comprising: a semiconductor light emitting device; a power supply circuit that supplies operating power; a drive circuit containing a passive element that accumulates and discharges the power from the power supply circuit and a plurality of switching elements that switch between a charging path that supplies and accumulates the power from the power supply circuit in the passive element and a discharging path that discharges the power accumulated in the passive element by causing the semiconductor light emitting device to emit light to intermittently drive the semiconductor light emitting device by switching between the charging path and the discharging path using the plurality of switching elements; a constant current switch controller that detects a voltage applied to a path when each one of the charging path and the discharging path is selected and switches the plurality of switching elements by calculating a switching duty ratio of the plurality of switching elements so that a current flowing through the passive element is maintained at a constant value in accordance with detection results; and a duty controller that adjusts a voltage value supplied by the power supply circuit in accordance with the switching duty ratio calculated by the constant current switch controller.

According to another aspect of the present invention, there is provided a method of controlling a semiconductor light source apparatus having a semiconductor light emitting device, a power supply circuit that supplies operating power, and a drive circuit containing a passive element that accumulates and discharges the power from the power supply circuit and a plurality of switching elements that switch between a charging path that supplies and accumulates the power from the power supply circuit in the passive element and a discharging path that discharges the power accumulated in the passive element by causing the semiconductor light emitting device to emit light to intermittently drive the semiconductor light emitting device by switching between the charging path and the discharging path using the plurality of switching elements, the method comprising: performing constant current switch control to detect a voltage applied to a path when each one of the charging path and the discharging path is selected, and to switch the plurality of switching elements by calculating a switching duty ratio of the plurality of switching elements so that a current flowing through the passive element is maintained at a constant value in accordance with detection results; and performing duty control to adjust a voltage value supplied by the power supply circuit in accordance with the switching duty ratio calculated by the constant current switch control.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a timing chart showing each signal waveform in the circuit in FIG. 1 according to the embodiment, in which (A) shows the signal waveform applied to a first switching element in the circuit in FIG. 1 according to the embodiment, (B) shows the signal waveform applied to a second switching element in the circuit in FIG. 1 according to the embodiment, (C) shows the signal waveform applied to a third switching element in the circuit in FIG. 1 according to the embodiment, (D) shows the signal waveform applied to a fourth switching element in the circuit in FIG. 1 according to the embodiment, (E) shows the current value applied to an inductor in the circuit in FIG. 1 according to the embodiment, (F) shows the current value applied to a diode in the circuit in FIG. 1 according to the embodiment, and (G) shows the current value applied to an LED in the circuit in FIG. 1 according to the embodiment.

DETAILED DESCRIPTION OF THE INVENTION

Figure 1:
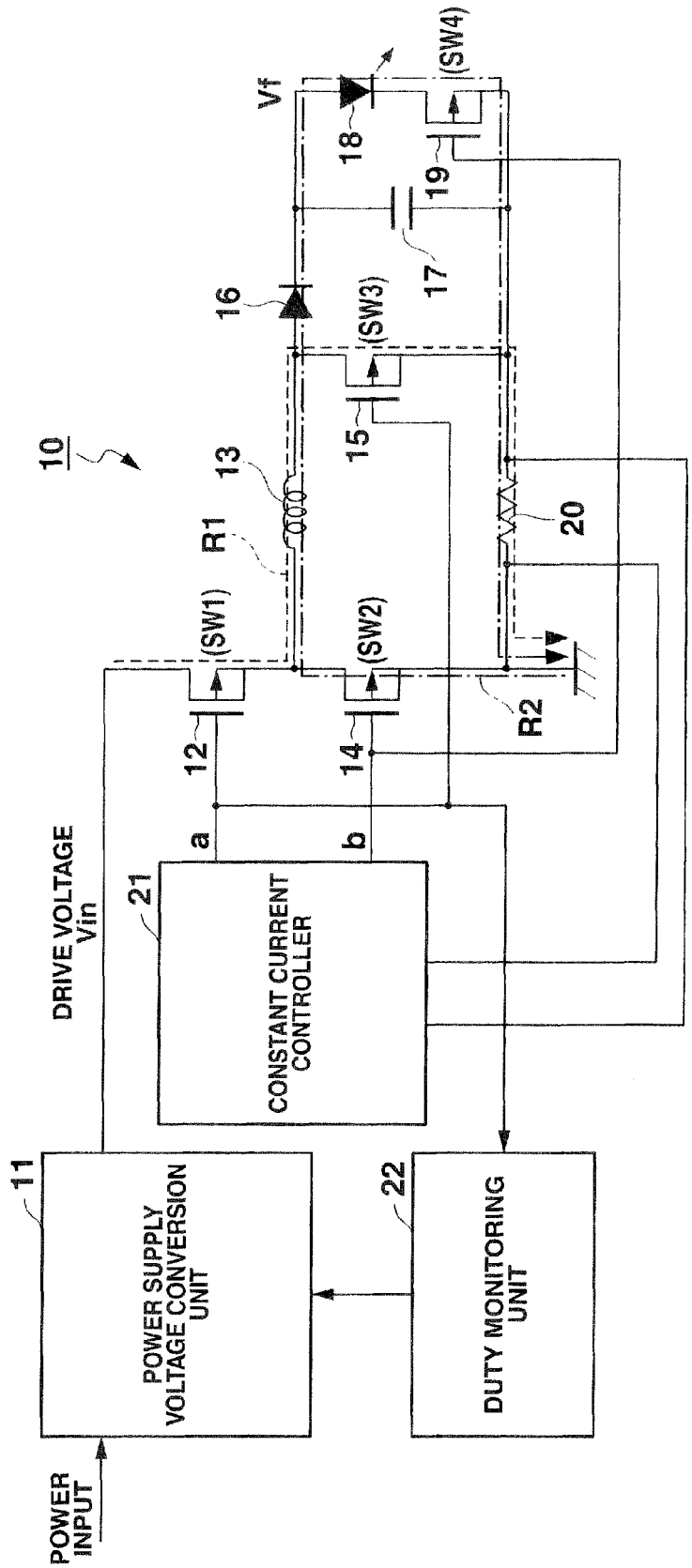
FIG. 1 is a diagram showing a configuration of a PWM drive circuit of a semiconductor light emitting device according to an embodiment of the present invention.

Embodiments of the present invention will be explained below with reference to the drawings.

FIG. 1 is a diagram showing a circuit configuration of a semiconductor light source apparatus 10 according to the embodiment. In FIG. 1, power input supplied to the apparatus is provided to a power supply voltage conversion unit 11. In the power supply voltage conversion unit 11, a DC drive voltage Vin that changes in accordance with control from a duty monitoring unit 22 described later is continuously supplied to the drain of an n-channel FET 12 used as a first switching element (SW1).

The source of the FET 12 is connected to one end of an inductor 13 and is also connected to the drain of an n-channel FET 14 used as a second switching element (SW2).

The other end of the inductor 13 is connected to the drain of an n-channel FET 15 used as a third switching element (SW3) and to the anode of a diode 16. The cathode of the diode 16 is connected to one end of a capacitor 17 and also to a semiconductor light emitting device, for example, the anode of an LED (light emitting diode) 18.

The cathode of the LED 18 is connected to the drain of an n-channel FET 19 used as a fourth switching element (SW4). The source of the FET 19 is connected to the other end of the capacitor 17 and the source of the FET 15. The capacitor 17 is inserted for the purpose of reducing a ripple current flowing through the LED 18 and also forming a square wave.

Further, the source of the FET 15 is connected to one end of a resistor 20. The other end of the resistor 20 is connected to the source of the FET 14 and is also grounded.

A constant current controller 21 is provided to control on/off timing of light emission of the apparatus. The constant current controller 21 supplies a PWM signal "a" to each gate of the FETs 12, 15 and the duty monitoring unit 22 and at the same time, supplies a PWM signal "b" obtained by inverting the PWM signal "a" to each gate of the FETs 14, 19 and the duty monitoring unit 22.

Further, potentials at both ends of the resistor 20 are detected by the constant current controller 21.

The constant current controller 21 performs control to maintain an intended constant current by sending the two mutually inverted PWM signals "a", "b" to the FETs 12, 15 and the FETs 14, 19 respectively while monitoring the voltage between both ends of the resistor 20.

That is, the constant current controller 21 and the inductor 13, the diode 16, the capacitor 17, and the resistor 20 constitute a drive circuit for the LED 18 and FETs 12, 15 and the FETs 14, 19 are disposed as switching elements that control current paths in the drive circuit. While bipolar transistors may be used as a plurality of switching elements, FETs are controlled by voltage and the number of parts such as resistors can be reduced when FETs are used.

The duty monitoring unit 22 monitors each on/off duty of the two PWM signals "a", "b" output by the constant current controller 21. The duty monitoring unit 22 controls the value of the drive voltage Vin converted and output by the power supply voltage conversion unit 11 so that the duty maintains the intended constant value.

Next, the operation of the above embodiment will be described.

The constant current controller 21 provides the PWM signal "a" shown in (A), (C) in FIG. 2 to each gate of the FETs 12, 15 and at the same time, provides the PWM signal "b" shown in (B), (D) in FIG. 2 and obtained by inverting the PWM signal "a" to each gate of the FETs 14, 19.

The FETs 12, 15 are turned on and a current flows along a current path R1 of charging shown by a broken line in FIG. 1 so that energy is accumulated in the inductor 13.

Next, when the FETs 12, 15 are turned off and, on the other hand, the FETs 14, 19 are turned on, energy accumulated in the inductor 13 then flows along a current loop R2 of discharging shown by an alternate short and long dash line in FIG. 1 and the energy passes through the LED 18, which is a load, to emit light in the process and is also discharged.

The current flowing through the inductor 13 repeats a pattern in which, as shown in (E) in FIG. 2, the current gradually rises from a current Ia (Ia>0) when the FETs 12, 15 are turned on to start up and after peaking at a current Ib (Ia<Ib) when the FETs 12, 15 are turned off to start to fall, the current gradually fails to the current Ia when the FETs 12, 15 are turned on to start up again. The current flowing through the diode 16 repeats a pattern in which, as shown in (F) in FIG. 2, no current flows while the FETs 12, 15 are turned on and a current flows while the FETs 12, 15 are turned off.

On the other hand, the current flowing through the LED 18, which is a light emitting device, flows, as shown in (C) in FIG. 2, as a current accumulated in the inductor 13 in a period in which the FETs 14, 19 are turned on so that the pulse waveform of current close to, as shown in (G), a square wave and having fast rise characteristics can be obtained.

The condition for maintaining the current flowing through the LED 18 constant can be expressed by the relational expression shown below. That is, $$\text{Duty} = Vf/(Vin + Vf) \tag{1}$$

(where, Vf: voltage applied to the LED, Vin: drive voltage)

To drive a constant current while keeping the intended duty, it is only necessary to maintain the relationship between the drive voltage Vin and the voltage Vf applied to the LED 18 satisfying the above formula (1).

Therefore, the constant current controller 21 adjusts the duty of each of the PWM signals "a", "b" to the FETs 12, 15 and the FETs 14, 19 respectively to maintain the intended constant current by detecting the voltage value between both ends of the resistor 20 by feedback to adjust the energy accumulated in the inductor 13.

The duty monitoring unit 22 monitors duties of both PWM signals "a", "b" to the FETs 12, 15 and the FETs 14, 19 respectively to issue a command to the power supply voltage conversion unit 11 so that the duties have the intended values.

Based on the command from the duty monitoring unit 22, the power supply voltage conversion unit 11 shifts the drive voltage Vin to a necessary voltage value.

While the capacitor 17 is inserted, as described above, to reduce the ripple current flowing through the LED 18, which is a semiconductor light emitting device, the charging current thereof can inhibit a fast rising operation in the LED 18 by absorbing a rising current of the LED 18.

Thus, while the PWM signal "a" is on, the discharge path of the capacitor 17 through the LED 18, that is, the discharge path of the capacitor 17 composed of the positive electrode of the capacitor 17, the anode of the LED 18, the cathode of the LED 18, the drain of the FET 19, the source of the FET 19, and the negative electrode of the capacitor 17 is turned off by turning off the FET 19 by the PWM signal "b" obtained by inverting the PWM signal "a" and also the discharge of charges of the capacitor 17 by a current flowing in the direction of the FET 15 is curbed by the diode 16 to be able to hold the voltage of the capacitor 17 before the PWM signal "a" is turned off next time.

Thus, the current for the LED 18 will not be absorbed by the current to charge the capacitor 17 next, so that rise characteristics of the LED 18 can be made sufficiently steep and fast.

The constant current controller 21 can be realized by a configuration similar to that of a constant current feedback type step-down DC/DC converter commonly in IC forms and such a type is already commercially available with a switching frequency up to the order of several [MHz]. Therefore, by adopting such ICs as a current control circuit, PWM periods on the order of several [MHz] can be controlled.

According to the present embodiment, as described above in detail, the property of the inductor 13 that a current does not change rapidly is used to maintain a constant current and in addition, a saturation region, instead of an analog region, of the FETs 12, 15 and the FETs 14, 19, which are switching elements, is used for causing a switching operation and therefore, driving by PWM signals can be realized at high speed with efficiency and stability.

In the above embodiment, a case when the present invention is applied to an apparatus that drives a light emitting diode (LED) as a semiconductor light emitting device is described, but the present invention is not limited to such an example and may be applied to an apparatus that drives, for example, a laser diode (LD) or organic electroluminescence (EL). Further, the number of semiconductor light emitting devices used in a circuit should not be limited.

In the above embodiment, a case when a PWM drive circuit of the DC/DC converter system of constant current control is used as a drive circuit is described, but the present invention does not limit the system of the drive circuit.

Further, as an apparatus using the semiconductor light source apparatus, for example, the application to a projector apparatus of the digital light processing (DLP) (registered trademark) system in which LEDs of colors R, G, B are intermittently driven by field sequential driving in a time division fashion can be considered.

In that case, if the frame frequency is, for example, 120 [Hz] in synchronization with the image display of a micro-mirror element to form an optical image and it is necessary to switch the duty of each color in units of percentage in accordance with the projection mode set at that point, such a case can handled with adequate stability.

In addition, the present invention is not limited to the above embodiment and various modifications can be made without deviating from the scope thereof in the stage of carrying out the invention. Functions executed in the above embodiment may be appropriately combined if possible. The above embodiment includes various stages and various inventions can be extracted from appropriate combinations of a plurality of disclosed structural features. If, for example, an effect can be achieved even if some structural features are eliminated from all structural features shown in an embodiment, the configuration obtained after such structural features being eliminated can be extracted as an invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor light source apparatus, comprising:
   a semiconductor light emitting device;
   a power supply circuit that supplies operating power;
   a drive circuit including (i) a passive element that accumulates and discharges the power from the power supply circuit, (ii) a charging path that supplies and accumulates the power from the power supply circuit in the passive element, (iii) a discharging path that discharges the power accumulated in the passive element by causing the semiconductor light emitting device to emit light, and (iv) a plurality of switching elements that switch between the charging path and the discharging path, and thereby intermittently drive the semiconductor light emitting device;
   a constant current switch controller that (A) detects a voltage applied to a path when each one of the charging path and the discharging path is selected and (B) switches the plurality of switching elements by calculating a switching duty ratio of the plurality of switching elements such that a current flowing through the passive element is maintained at a constant value in accordance with detection results; and
   a duty monitoring unit that adjusts a voltage value of the power supplied by the power supply circuit in accordance with the switching duty ratio calculated by the constant current switch controller.

2. The semiconductor light source apparatus according to claim 1, further comprising a capacitor connected to the semiconductor light emitting device and the plurality of switching elements.

3. The semiconductor light source apparatus according to claim 1, wherein the passive element is an inductor.

4. The semiconductor light source apparatus according to claim 1, wherein the plurality of switching elements are FETs.

5. The semiconductor light source apparatus according to claim 1, wherein the semiconductor light emitting device is an LED, LD, or organic EL.

6. A semiconductor light source control method for use in a semiconductor light source apparatus having a semiconductor light emitting device, a power supply circuit that supplies operating power, and a drive circuit including (i) a passive element that accumulates and discharges the power from the power supply circuit, (ii) a charging path that supplies and accumulates the power from the power supply circuit in the passive element, (iii) a discharging path that discharges the power accumulated in the passive element by causing the semiconductor light emitting device to emit light, and (iv) a plurality of switching elements that switch between the charging path and the discharging path, and thereby intermittently drive the semiconductor light emitting device, the method comprising:
   performing constant current switch control (A) to detect a voltage applied to a path when each one of the charging path and the discharging path is selected, and (B) to switch the plurality of switching elements by calculating a switching duty ratio of the plurality of switching elements such that a current flowing through the passive element is maintained at a constant value in accordance with detection results; and
   performing duty monitoring to adjust a voltage value of the power supplied by the power supply circuit in accordance with the switching duty ratio calculated by the constant current switch control.

7. The semiconductor light source control method according to claim 6, further comprising connecting a capacitor to the semiconductor light emitting device and the plurality of switching elements.

8. The semiconductor light source control method according to claim 6, wherein the passive element is an inductor.

9. The semiconductor light source control method according to claim 6, wherein the plurality of switching elements are FETs.

10. The semiconductor light source control method according to claim 6, wherein the semiconductor light emitting device is an LED, LD, or organic EL.

* * * * *